United States Patent
Zyskowski et al.

(10) Patent No.: US 6,724,442 B1
(45) Date of Patent: Apr. 20, 2004

(54) OPTICALLY SWITCHABLE INFRARED DETECTOR

(75) Inventors: Paul J. Zyskowski, Chandler, AZ (US); Chris D. Lucero, Phoenix, AZ (US)

(73) Assignee: Intel Corporation, Santa Clara, CA (US)

(*) Notice: Subject to any disclaimer, the term of this patent is extended or adjusted under 35 U.S.C. 154(b) by 0 days.

(21) Appl. No.: 09/277,637

(22) Filed: Mar. 26, 1999

(51) Int. Cl.[7] .............. H04N 5/44; H04Q 19/00
(52) U.S. Cl. .............. 348/734; 348/552; 348/832; 348/836; 348/842; 340/825.25; 340/825.69; 340/825.72
(58) Field of Search .............. 348/734, 552, 348/836, 842, 832; 728/37, 139, 181, 100, 68; 340/825.69, 825.72, 825.25; 398/106, 39

(56) References Cited

U.S. PATENT DOCUMENTS

| | | | | |
|---|---|---|---|---|
| 4,143,263 A | * | 3/1979 | Eichweber | 359/170 |
| 4,340,813 A | * | 7/1982 | Sauer | 250/221 |
| 4,734,585 A | * | 3/1988 | Owers | 250/353 |
| 4,899,370 A | * | 2/1990 | Kameo et al. | 379/102.03 |
| 4,907,895 A | * | 3/1990 | Everest | 374/130 |
| 4,967,268 A | * | 10/1990 | Lipton et al. | 348/56 |
| 5,181,133 A | * | 1/1993 | Lipton | 345/94 |
| 5,343,239 A | * | 8/1994 | Lappington et al. | 348/478 |
| 5,436,457 A | * | 7/1995 | Tomita | 250/343 |
| 5,528,391 A | * | 6/1996 | Elrod | 349/1 |
| 5,576,773 A | * | 11/1996 | Itagaki et al. | 386/96 |
| 5,606,444 A | * | 2/1997 | Johnson et al. | 359/152 |
| 5,654,749 A | * | 8/1997 | Kanno | 348/51 |
| 5,657,414 A | * | 8/1997 | Lett et al. | 348/734 |
| 5,677,895 A | * | 10/1997 | Mankovitz | 348/563 |
| 5,677,909 A | * | 10/1997 | Heide | 370/347 |
| 5,689,353 A | * | 11/1997 | Darbee et al. | 340/825.72 |
| 5,787,259 A | * | 7/1998 | Haroun et al. | 348/14.04 |
| 5,790,188 A | * | 8/1998 | Sun | 348/143 |
| 5,808,703 A | * | 9/1998 | Karlqvist | 348/725 |
| 5,894,278 A | * | 4/1999 | Kubo et al. | 348/734 |
| 5,903,247 A | * | 5/1999 | Howard et al. | 345/87 |
| 5,912,700 A | * | 6/1999 | Honey et al. | 348/157 |
| 5,949,351 A | * | 9/1999 | Hahm | 340/825.25 |
| 6,023,292 A | * | 2/2000 | Wakui | 348/207 |
| 6,032,089 A | * | 2/2000 | Buckley | 307/10.1 |
| 6,049,653 A | * | 4/2000 | Furrey et al. | 386/83 |
| 6,107,938 A | * | 8/2000 | Du et al. | 307/117 |
| 6,151,084 A | * | 11/2000 | Goto et al. | 348/835 |
| 6,249,914 B1 | * | 6/2001 | Harrison et al. | 348/552 |
| 6,281,927 B1 | * | 8/2001 | Otto et al. | 348/61 |
| 6,300,623 B1 | * | 10/2001 | Charlier et al. | 250/252.1 |
| 2001/0012053 A | * | 7/1996 | Nakamura | 348/45 |

FOREIGN PATENT DOCUMENTS

| | | | | |
|---|---|---|---|---|
| JP | 01296897 A | * | 11/1989 | H04Q/9/00 |
| JP | 08140156 A | * | 5/1996 | H04Q/9/00 |

* cited by examiner

*Primary Examiner*—John Miller
*Assistant Examiner*—Paulos Natnael
(74) *Attorney, Agent, or Firm*—Trop, Pruner & Hu, P.C.

(57) ABSTRACT

A system includes a shutter which selectively allows access to an infrared detector, when accessed directly by a processor-based system, such as a set-top computer system. In this way, infrared commands may be blasted from a set-top computer system to an appliance, e.g., a television receiver, without interference from other remote control units. When the controlling device is not sending signals to the television receiver, the shutter may allow other remote control units to control the appliance. The shutter may be a voltage controlled liquid crystal shutter, whose transmissivity is a function of the applied voltage.

12 Claims, 3 Drawing Sheets

OPTICALLY SWITCHABLE INFRARED DETECTOR

BACKGROUND

This invention relates generally to devices which may be controlled by infrared signals.

A variety of electronic devices are controlled by infrared signals. For example, television receivers may be controlled by a remote control which generates unidirectional infrared signals to control the settings of the television receiver. In addition, a number of processor-based systems, such as set-top computer systems, may be controlled using infrared remote control units. For example, a television receiver may be controlled by infrared transmissions, which may be communicated from a remote control unit or a set-top computer system situated on the television receiver.

The set-top personal computer system may be used to access Internet information that is viewed on a television receiver. In one embodiment, the set-top computer system may access an Internet site containing information about currently available television programs. The set-top computer may then convey-control signals via an infrared transmitter and cable to an infrared detector on the television receiver to control the timing of the television receiver based on inputs received from the user. Thus, as the user inputs commands to select a particular program displayed on the television receiver by the set-top personal computer system, the television tuner may be operated to select the desired program.

In many cases, the set-top computer provides an electronic signal to the television receiver, which may be conveyed through a cable. On its end remote from the computer system, the cable may include a transducer which converts electrical signals into infrared signals. These infrared signals are then blasted into the infrared detector on the television receiver. Commonly, the transducer is secured to the infrared detector cover using adhesive attachment. Thus, the commands from the set-top computer can be blasted directly into the television's infrared detector.

While infrared signals are being blasted directly from the set-top computer into the infrared detector on the television, the user may also operate a remote control-unit which similarly sends infrared signals that are received by the same infrared detector. These signals from the remote control unit interfere with the commands being transmitted by the computer system.

To overcome this problem, it is known to cover the television's infrared detector and common infrared transmitter with tape so only those signals transmitted from the set-top computer over a cable are received by the detector. Although this solves the interference problem, it creates another problem. In many cases, when the set-top personal computer is not sending commands to the television receiver, it is desirable to control the television receiver using the television remote control unit. While many of the same operations may be done using a remote control unit provided with the set-top personal computer system, some users may prefer to directly control the television receiver, without using the computer system. When the detector is taped over, this is not possible.

Thus, there is a need for a way to allow remote control units to be utilized in conjunction with set-top personal computer systems to control television receivers and other consumer electronic devices.

SUMMARY

In accordance with one embodiment, a shutter for an infrared detector includes a cover arranged to be mounted over the detector. An infrared port is formed in the cover. The infrared transmissivity of the port is selectively, electrically alterable.

DETAILED DESCRIPTION

Figure 1:
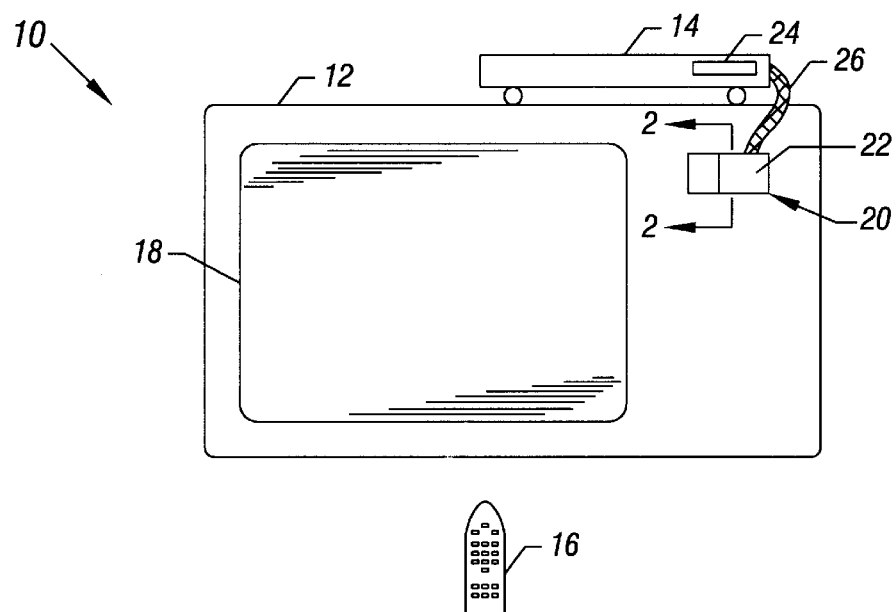
FIG. 1 is a front elevational view of one embodiment of the present invention.

A video receiver 12, which may be a television receiver, is coupled to a processor-based system 14, such as a set-top computer system as shown in FIG. 1. The system 14 may be controlled by a remote control unit (RCU) 16, which may provide infrared signals to control either the computer system via an infrared detector 24 or the receiver 12 itself, via an infrared detector 22.

The receiver 12 may include a display 18 and a window 20, which may include a channel display indicator and the infrared detector 22. The infrared detector 22 communicates with the system 14 via a cable 26.

Figure 2:
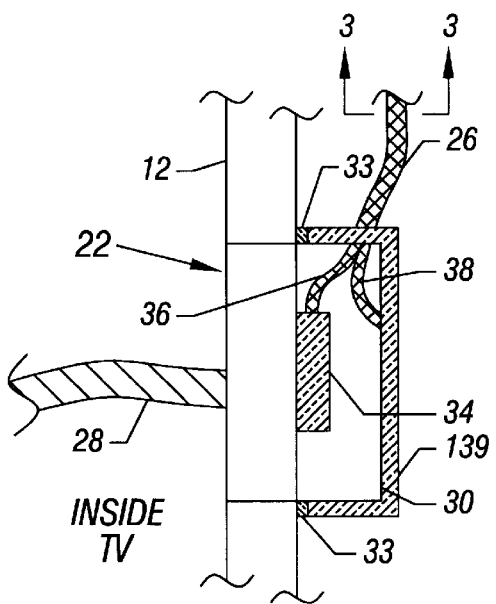
FIG. 2 is an enlarged cross-sectional view taken generally along the line 2—2 in FIG. 1.

Control signals generated by the system 14 may be, conveyed through the cable 26. As indicated in FIG. 2, the cable 26, which may be called an "IR blaster", communicates with an infrared emitter 34, which converts electrical signals transmitted over the cable into infrared signals. These infrared signals may be directly "blasted" into an infrared detector 22 mounted in the video receiver 12. The detected infrared signals may be converted into electrical signals and conveyed over a cable 28 for control of the video receiver 12. For example, in one embodiment of the present invention, the cable 28 may couple a television tuner (not shown).

Associated with the transducer 34 is a cover 30, which may be secured over the infrared detector 22. For example, in one embodiment of the present invention, adhesive tabs 33 may be used to secure the cover 30, so as to completely occlude the infrared detector 22. The cable 26 may penetrate through the cover 30 to provide a cable wire 36, which communicates with the emitter 34, and a cable 38 which provides control signals to the cover 30. The cover 30 may include a shutter 39, which is selectively, electrically alterable to change its transmissivity to infrared radiation.

In one embodiment of the present invention, the shutter 39 is a liquid crystal shutter. By applying a potential over the cable 38 to the shutter, the shutter's transmissivity of infrared radiation may be selectively altered. In one embodiment of the present invention, the shutter 39 may be selectively switched in one mode, to allow infrared radiation to freely pass, and in another mode, to completely block incident infrared radiation from reaching the infrared detector 22.

Figure 3:
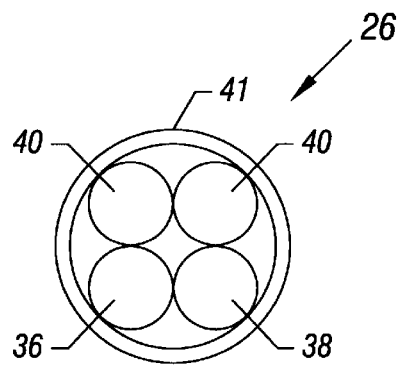
FIG. 3 is an enlarged cross-sectional view taken generally along the line 3—3 in FIG. 2.

The cable 26, as shown in FIG. 3, may include a sheath 41 which covers a pair of ground wires 40 and the wires 36 and 38, described previously. Thus, control signals to control the shutter may be transmitted in the same cable that also transmits signals which control the emitter 34.

Figure 4:
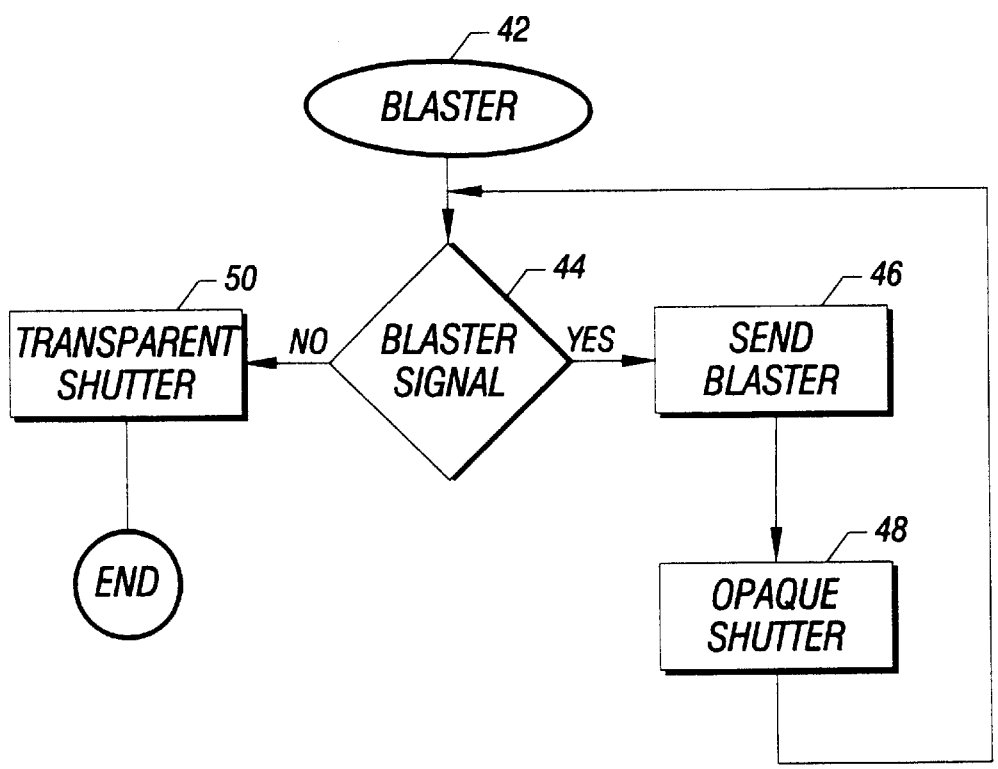
FIG. 4 is a flow chart showing one embodiment of software which may be used to implement the embodiment shown in FIG. 1.

Turning now to FIG. 4, the software 42 for controlling the shutter 39 may be stored in the processor-based system 14, as will be described hereinafter. Initially, a check at diamond 44 determines whether a blaster signal is being transmitted by the system 14 over the cable 36 to the video receiver 12. If so, the signal is provided over the cable 26 through the transducer 34, and fed into the infrared detector 22 (block 46). At the same time, a signal is provided over the cable 38 to change the transmissivity of the shutter 39. Namely, the shutter 39 is made opaque to block infrared radiation, as indicated in block 48, using well known liquid crystal shutters. If there is no ongoing transmission over the cable 26, the shutter 39 can be caused to become transparent, as indicated in block 50, and the flow ends.

Liquid crystal shutters are electrically controllable to control the transmissivity of a liquid crystal material. Namely, by applying an appropriate potential, the polarization of the liquid crystal element may be controlled. Conventionally, liquid crystal shutters may include a neutral linear polarizer. Neutral linear polarizers are commercially available from a variety of companies, including Polaroid Corporation of Cambridge, Mass. Behind the polarizer may be a liquid crystal. The liquid crystal may include a pair of glass substrates, which may, for example, be made of borosilicate glass. A liquid crystal material contained between the glass substrates may pass light in only one polarization. Thus, by controlling the polarization of the neutral linear polarizer, the ability of the device to pass light may be selectively, electrically controlled.

Figure 5:
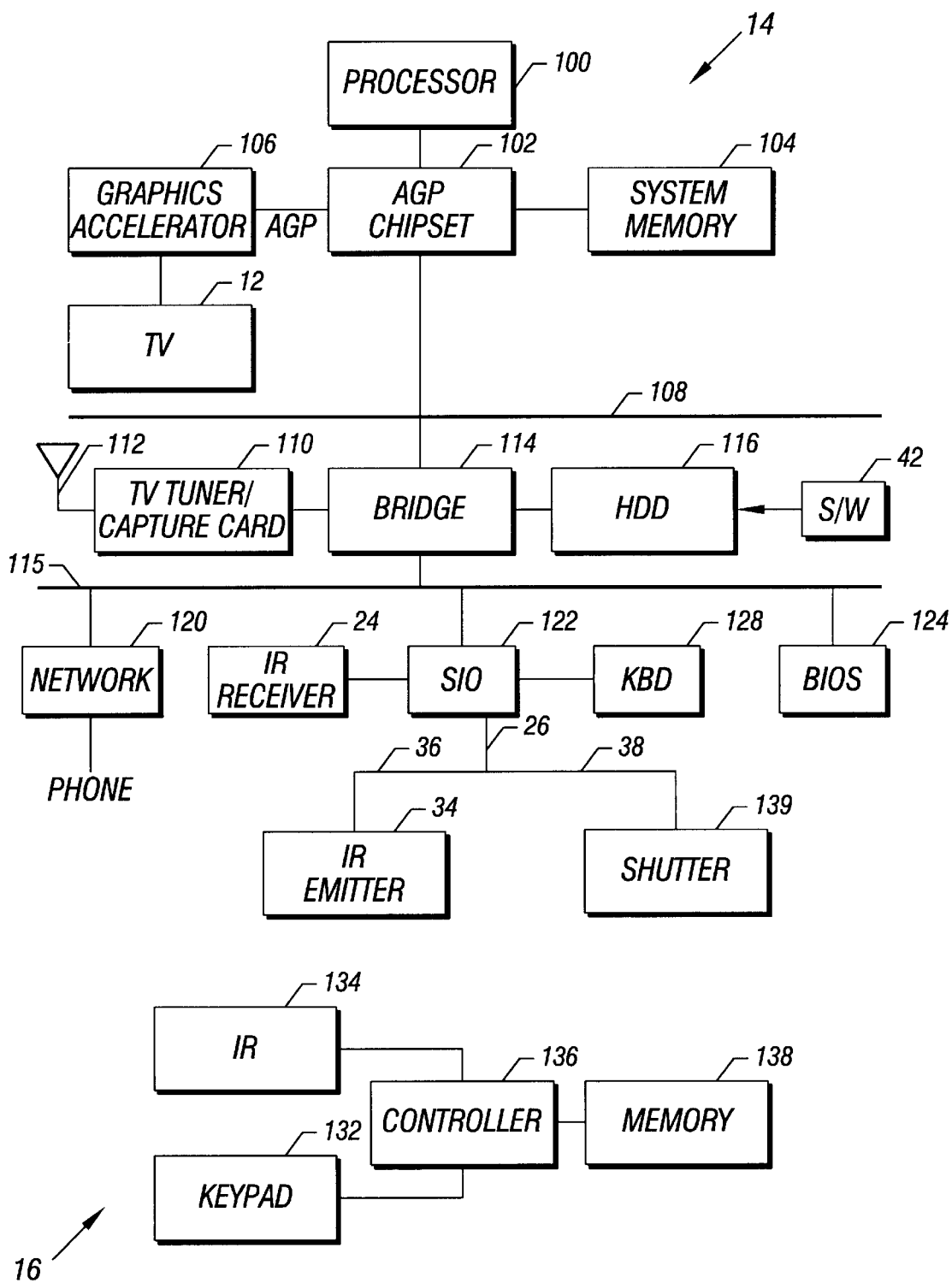
FIG. 5 is a block diagram of one embodiment for implementing the system shown in FIG. 1.

Referring now to FIG. 5, an example of a system for providing the capabilities described previously may involve either a computer, television receiver, set-top computer system, or another appliance. The illustrated system 14 includes a processor 100 coupled to an accelerated graphics port (AGP) chipset 102. AGP is described in detailed in the *Accelerated Graphics Port Interface Specification*, Revision 2.0, published in 1998 by Intel Corporation of Santa Clara, Calif. The AGP chipset 102 may, in turn, be coupled to system memory 104 and a graphics accelerator 106. The graphics accelerator 106 may be coupled to a video receiver 12.

The chipset 102 may also be coupled to a bus 108, which may in turn be coupled to a television tuner/capture card 110. The tuner/capture card 110 may be coupled to a television input signal 112. The television input signal 112 may, for example, be a conventional television antenna, satellite antenna, cable connection, or other television input. The tuner/capture card 110 may receive television signals in one video format and convert them into a format used by the system 14.

The bus 108 may also be coupled to another bridge 114, which in turn, couples a hard-disk drive 116. The hard-disk drive 116 may store the software 42.

The bridge 114 may be coupled to a bus 115, coupled to a serial input/output (SIO) device 122, a network 120, and a basic input/output system (BIOS) 124. The SIO device 122 may interface to a keyboard 128, an infrared emitter 34, and a liquid crystal shutter 139. In addition, the SIO device 122 may also be coupled to the RCU 16 through an IR receiver 24 to enable the system to receive inputs from a wireless remote control. The network 120 may, for example, be a connection to a telephone network, local area network or cable connection.

The infrared emitter 34 may, for example, be in accordance with the Infrared Data Association protocols, e.g., the Serial Infrared Visible Layer Link Specification, Version 1.2, dated Nov. 30, 1997. Alternatively, the infrared emitter 34 may be a legacy infrared device. The remote control unit 16 may be include a keypad 132, coupled to an infrared transmitter 134, which transmits the infrared signal received by the infrared emitter 34. A controller 136 may control the transmitter 134 and receive information from the keypad 132. The controller 136 may have associated with it memory 138, which in one illustrated embodiment, may be nonvolatile random access memory (NVRAM).

While the present invention has been described with respect to a limited number of embodiments, those skilled in the art will appreciate numerous modifications and variations therefrom. It is intended that the appended claims cover all such modifications and variations, as fall within the true spirit and scope of the present invention.

What is claimed is:

1. A device comprising:

an infrared detector;

a cover arranged to be mounted over said detector, said cover including a port that includes a liquid crystal shutter;

an infrared emitter inside said cover; and an element to determine whether a control signal has been transmitted to said infrared emitter and if so, selectively, electrically altering the transmissivity of said cover to make said cover substantially opaque to infrared radiation.

2. The device of claim 1 wherein said cover is adapted to be adhesively secured to said detector.

3. The device of claim 1 further including an infrared emitter located inside said cover.

4. The device of claim 3 wherein said emitter is coupled to a cable, said cable including a first line for conducting signals to said infrared emitter and a second line adapted to conduct control signals to an infrared port.

5. A processor based system adapted to control a television receiver comprising:

a processor;

memory coupled to said processor;

a device coupled to said processor, said device adapted to generate control signals for said television receiver, said device including a cable for conducting electrical signals generated by said device, said device further including an infrared emitter coupled to said cable and adapted to convert electrical signals transmitted along said cable into infrared signals for controlling said television receiver;

a cover arrangement to be mounted over said television receiver; and an infrared port formed in said cover, the infrared transmissivity of said port being selectively, electrically alterable.

6. The system of claim 5 wherein said port includes a liquid crystal shutter.

7. The system of claim 5 wherein said cover is adapted to be adhesively secured to said receiver.

8. The system of claim 5 wherein said infrared emitter is located inside said cover.

9. A device comprising:

an infrared detector;

a cover arranged to be mounted over said detector;

an infrared emitter mounted inside said cover;

an element to determine whether a control signal has been transmitted to said infrared emitter and if so, selectively, electrically altering the transmissivity of said cover to make said cover substantially opaque to infrared radiation; and wherein said emitter is coupled to a cable, said cable including a first line for conducting electrical signals to said infrared emitter and a second line adapted to conduct control signals to an infrared port.

10. The device of claim 9 wherein said cover includes a liquid crystal shutter.

11. The device of claim 9 wherein said cover is adapted to be adhesively secured to said detector.

12. The device of claim 9 further including an infrared emitter located inside said cover.

* * * * *